United States Patent
Shimoda

(10) Patent No.: US 10,683,413 B2
(45) Date of Patent: Jun. 16, 2020

(54) POLYACETAL RESIN COMPOSITION AND SLIDING MEMBER

(71) Applicant: Polyplastics Co., Ltd., Tokyo (JP)

(72) Inventor: Akihide Shimoda, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 15/510,381

(22) PCT Filed: Jun. 11, 2015

(86) PCT No.: PCT/JP2015/066878
§ 371 (c)(1),
(2) Date: Mar. 10, 2017

(87) PCT Pub. No.: WO2016/051881
PCT Pub. Date: Apr. 7, 2016

(65) Prior Publication Data
US 2017/0306141 A1    Oct. 26, 2017

(30) Foreign Application Priority Data

Sep. 29, 2014  (JP) .................................. 2014-198326

(51) Int. Cl.
| | | |
|---|---|---|
| C08L 59/00 | (2006.01) |
| C08L 71/02 | (2006.01) |
| F16C 33/20 | (2006.01) |
| C08L 23/26 | (2006.01) |
| C08L 23/02 | (2006.01) |
| C08L 51/06 | (2006.01) |
| C08L 59/04 | (2006.01) |
| C08K 3/26 | (2006.01) |

(52) U.S. Cl.
CPC ............... *C08L 59/00* (2013.01); *C08L 23/02* (2013.01); *C08L 23/26* (2013.01); *C08L 51/06* (2013.01); *C08L 59/04* (2013.01); *C08L 71/02* (2013.01); *F16C 33/20* (2013.01); *F16C 33/201* (2013.01); *C08K 2003/265* (2013.01); *C08L 2205/03* (2013.01); *F16C 2208/66* (2013.01)

(58) Field of Classification Search
CPC .................................. C08L 59/00; C08K 3/26
See application file for complete search history.

(56) References Cited

U.S. PATENT DOCUMENTS

| | | | |
|---|---|---|---|
| 5,854,324 A | 12/1998 | Tajima et al. | |
| 6,284,828 B1 | 9/2001 | Takayama | |
| 7,625,969 B2 | 12/2009 | Sonobe et al. | |
| 7,638,569 B2 * | 12/2009 | Sonobe | C08K 3/26 |
| | | | 475/331 |
| 2007/0179231 A1 | 8/2007 | Sonobe et al. | |

| | | | |
|---|---|---|---|
| 2017/0283608 A1 | 10/2017 | Shimoda | |
| 2017/0306140 A1 | 10/2017 | Shimoda | |
| 2017/0306141 A1 | 10/2017 | Shimoda | |

FOREIGN PATENT DOCUMENTS

| | | | |
|---|---|---|---|
| CN | 102585432 A | | 7/2012 |
| JP | H06-345938 | | 12/1994 |
| JP | H11-060802 | | 8/1997 |
| JP | H10-130457 | | 5/1998 |
| JP | H10-130458 | | 5/1998 |
| JP | 2003-202007 | | 7/2003 |
| JP | 2006-348265 | | 12/2006 |
| JP | 2012-116883 A | | 6/2012 |
| JP | 2012-136656 A | | 7/2012 |
| JP | 2013237742 A | * | 11/2013 |
| JP | 2016-069452 A | | 5/2016 |
| JP | 2016-069453 A | | 5/2016 |
| WO | WO 96/034054 | | 10/1996 |
| WO | WO 2005/071011 | | 8/2005 |

OTHER PUBLICATIONS

Machine translated English language equivalent of JP 2013-237742 (Nov. 2013, 15 pages).*
Extended European search report in European Patent Application No. 15848042.6, dated Aug. 2, 2017.
International Search Report for International Application No. PCT/JP2015/066881 dated Sep. 1, 2015.
International Search Report for International Application No. PCT/JP2015/066883 dated Sep. 1, 2015.
Notification of Reasons for Refusal in JP Patent Application No. 2014-198327, dated May 8, 2018.

(Continued)

*Primary Examiner* — Brieann R Johnston

(74) *Attorney, Agent, or Firm* — Knobbe, Martens, Olson & Bear, LLP

(57) ABSTRACT

A polyoxymethylene (POM) resin composition which is used for a resin molded article having an excellent sliding characteristic and wear resistance property and also having an excellent surface property and peeling resistance property. This POM resin composition contains: (A) 100 parts by mass of a POM resin; (B) 0.01-1 parts by mass of a hindered phenolic antioxidant; (C) 0.05-1 parts by mass inclusive of a nitrogen-containing compound; (D) 0.5-10 parts by mass of a modified olefin polymer which is an olefin polymer that has been modified by an unsaturated carboxylic acid or the like; (E) 0.01-5 parts by mass of an alkylene glycol polymer that has a primary or secondary amino group and a number average molecular weight of 400-500,000; (F) 0.1-20 parts by mass of calcium carbonate which has a BET specific surface area of 15 m2/g or less, has a mean particle size of 50-200 nm or less, is surface-untreated, and is substantially cubic; (G) 0.1-10 parts by mass of a partial ester of a divalent to tetravalent alcohol; and (H) 0.1-10 parts by mass of an α-olefin oligomer.

2 Claims, No Drawings

(56) References Cited

OTHER PUBLICATIONS

Notification of Reasons for Refusal in JP Patent Application No. 2014-198328, dated May 8, 2018.
Office Action issued in CN Patent Application No. 201580048039.3, dated May 30, 2018.
Office Action issued in CN Patent Application No. 201580048038.9, dated Jul. 4, 2018.
Office Action issued in U.S. Appl. No. 15/510,092, dated Feb. 6, 2018.

* cited by examiner

POLYACETAL RESIN COMPOSITION AND SLIDING MEMBER

This application is the U.S. National Phase under 35 U.S.C. § 371 of International Application PCT/JP2015/066878, filed Jun. 11, 2015, designating the U.S., and published in Japanese as WO 2016/051881 on Apr. 7, 2016, which claims priority to Japanese Patent Application No. 2014-198326, filed Sep. 29, 2014, the entire contents of which are incorporated herein by reference.

TECHNICAL FIELD

The present invention relates to a polyacetal resin composition and a sliding member.

BACKGROUND ART

Polyacetal resins (also referred to as polyoxymethylene resins, and abbreviated as POM resins) have balanced mechanical properties as well as excellent friction/abrasion resistance properties, chemical resistance, thermal resistance, electrical properties, and the like, and thus are widely used in the fields of automobiles, electric/electronic products, and the like.

However, required properties in these fields are increasingly demanding. As an example, further improvements are desired in not only general physical properties but also sliding properties. The aforementioned sliding properties mean friction/abrasion properties against inorganic-filler compounding materials. As an example, inorganic-filler compounding materials in which inorganic fillers such as glass fiber, glass flake, talc, and mica are blended with acrylonitrile-butadiene-styrene copolymer synthetic resin (ABS resin), polycarbonate (PC)/ABS resin, polybutylene terephthalate (PBT)/ABS resin are increasingly popular for use in chassis of CD-ROMs in response to demanding requirements for cost/weight reduction.

Conventionally, gear components and lever components usually slide against metal bosses caulked on sheet metal chassis, and thus friction/abrasion properties against metal materials have been important. However, when those members such as bosses are integrally molded with chassis using the aforementioned resin materials, the slidability against resin bosses and resin guides becomes more important.

Sliding against the aforementioned resin chassis materials requires much better friction/abrasion properties as compared with those required for sliding against conventional metal materials due to intrinsically poor friction/abrasion properties of ABS resin and the like as a counterpart member, adverse effects of a compounded inorganic filler on surface roughness, and the like. Therefore, improvements have been required.

Usually, a fluororesin or a polyolefin-based resin is added to a polyacetal resin in order to improve sliding properties. Alternatively, lubricating oils such as fatty acid, fatty acid ester, silicone oil, and various mineral oils are added.

Although addition of a fluororesin or a polyolefin-based resin may improve sliding properties to some extent, these resins have poor compatibility with polyacetal resins, resulting in unsatisfactory sliding properties under high surface pressure and poor abrasion resistance when sliding against an inorganic-filler compounding material.

In order to solve the aforementioned problems, a polyacetal resin composition is proposed, the polyacetal resin composition being obtained by melt kneading (A) a polyacetal resin, (B) a modified olefin-based polymer modified with at least one selected from the group consisting of unsaturated carboxylic acid and acid anhydrides thereof and derivatives thereof, and (C) an alkylene glycol-based polymer having a number average molecular weight of 400-500,000 and having a primary amino group or a secondary amino group, in which the (B) component is included in an amount of 1 to 100 parts by weight relative to 100 parts by weight of the (A) component, and the (C) component is included in an amount of 0.1 to 100% by weight relative to the (B) component (for example, see Patent Document 1).

Further, a polyacetal resin composition is proposed, the polyacetal resin composition being obtained by: blending (A) 100 parts by weight of a polyacetal resin with (B) 0.5 to 100 parts by weight of a modified olefin-based polymer in which (B-1) an olefin-based polymer is modified with at least one selected from the group consisting of (B-2) unsaturated carboxylic acid and acid anhydrides thereof and derivatives thereof, (C) 0.01 to 10 parts by weight of an alkylene glycol-based polymer having a number average molecular weight of 400 to 500,000 and having a primary amino group or a secondary amino group, and (D) 0.1 to 20 parts by weight of an inorganic filler; and performing melt kneading (for example, see Patent Document 2).

Moreover, a polyacetal resin composition is proposed, the polyacetal resin composition being obtained by blending (A) 100 parts by weight of a polyacetal resin with (B) 0.5 to 100 parts by weight of a modified olefin-based polymer in which (B-1) an olefin-based polymer is modified with at least one selected from the group consisting of (B-2) unsaturated carboxylic acid and acid anhydrides thereof and derivatives thereof, and (C) 0.1 to 20 parts by weight of an inorganic filler; and performing melt kneading (for example, see Patent Document 3).

Patent Document 1: PCT International Publication No. WO96/34054
Patent Document 2: Japanese Unexamined Patent Application, Publication No. H10-130457
Patent Document 3: Japanese Unexamined Patent Application, Publication No. H10-130458

DISCLOSURE OF THE INVENTION

Problems to be Solved by the Invention

However, even resin molded articles made from the resin compositions described in Patent Documents 1 to 3 may suffer from small unevenness on their surfaces, or may suffer from peeling-off when the resin molded articles are bent, leaving a room for improvement in the surface properties, peeling resistance and the like of the resin molded articles.

An object of the present invention is to provide a polyacetal resin composition which can be used for preparing a resin molded article having excellent sliding properties and abrasion resistance as well as excellent surface properties and peeling resistance.

Means for Solving the Problems

After conducting extensive studies to solve the aforementioned problems, the present inventors have found that the above object can be achieved by selecting specific materials for formulating a resin composition, and selecting specific ranges of the contents of these materials. Then the present invention has been completed. Specifically, the present invention can provide the followings.

(1) The present invention can provide a polyacetal resin composition, the polyacetal resin composition comprising:

(A) 100 parts by mass of a polyacetal resin; (B) from 0.01 parts by mass to 1 part by mass of a hindered phenol-based antioxidizing agents; (C) from 0.05 parts by mass to 1 part by mass of a nitrogen-containing compound; (D) from 0.5 parts by mass to 10 parts by mass of a modified olefin-based polymer in which an olefin-based polymer is modified with at least one selected from unsaturated carboxylic acid, acid anhydrides of the unsaturated fatty acid, and derivatives thereof; (E) from 0.01 parts by mass to 5 parts by mass of an alkylene glycol-based polymer having a number average molecular weight of 400 or more and 500,000 or less and having a primary amino group or a secondary amino group; (F) from 0.1 parts by mass to 20 parts by mass of surface-untreated and substantially cube-shaped calcium carbonate having a BET specific surface area of 15 m2/g or less and a mean particle size of 50 nm or more and 200 nm or less; (G) from 0.1 parts by mass to 10 parts by mass of a partial ester of a polyhydric alcohol having a valence of 2 or more and 4 or less; and (H) from 0.1 parts by mass to 10 parts by mass of an alpha olefin oligomer.

(2) Further, the present invention can provide a sliding member comprising a resin molded body comprising the polyacetal resin composition according to (1).

Effects of the Invention

The present invention can provide a polyacetal resin composition which can be used for preparing a resin molded article having excellent sliding properties and abrasion resistance as well as excellent surface properties and peeling resistance.

PREFERRED MODE FOR CARRYING OUT THE INVENTION

Below, specific embodiments of the present invention will be described in more detail. The present invention shall not be limited in any way to the following embodiments, and modifications may appropriately be made without departing from the scope of the present invention.
<Polyacetal Resin Composition>

The polyacetal resin composition according to the present invention includes (A) a polyacetal resin, (B) a hindered phenol-based antioxidizing agent, (C) a nitrogen-containing compound, (D) a modified olefin-based polymer, (E) an alkylene glycol-based polymer, (F) calcium carbonate, (G) a partial ester of a polyhydric alcohol, and (H) alpha olefin oligomer. Below, each component will be described.
[(A) Polyacetal Resin]

The polyacetal resin composition according to the present invention includes (A) the polyacetal resin. Hereafter, (A) the polyacetal resin may also be referred to as "the (A) component".

(A) the polyacetal resin may be any of the followings: a polyoxymethylene homopolymer as a high molecular compound having oxymethylene groups ($-CH_2O-$) as the main constituent unit; and a copolymer, a terpolymer, and a block polymer having oxymethylene groups as the main repeating unit and further having a small amount of a different constituent unit other than the oxymethylene group, for example, a unit derived from a copolymer such as ethyleneoxide, 1,3-dioxolane, and 1,4-butanediol. Further, (A) the polyacetal resin may be not only a liner, but also branched, or cross-linked molecular structure. Moreover, (A) the polyacetal resin may be a known modified polyoxymethylene having another organic group introduced. There is no particular limitation for the degree of polymerization thereof as long as it melt molding processability.

(A) In general, the polyacetal resin can be obtained by adding an appropriate amount of a molecular weight modifier, and performing cationic polymerization using a cationic polymerization catalyst. Molecular weight modifiers, cationic polymerization catalysts, polymerization methods, polymerization apparatus, catalyst-deactivation treatment after polymerization, methods of stabilizing treatment of the ends of a crude polyacetal copolymer obtained by polymerization, and the like, which may be used, are known from a large number of literatures. Basically, any of them can be used.

There is no particular limitation for the molecular weight of (A) the polyacetal resin, but the number average molecular weight thereof is preferably about 10,000 to 400,000. The number average molecular weight as used herein refers to a value in terms of polystyrene as measured by gel permeation chromatography (GPC).

The melt index (as measured at 190° C. under a load of 2.16 kg in accordance with ASTM-D1238, and hereinafter also referred to as "MI") used as an index of the fluidity of a resin is preferably 1 to 50 g/10 min., more preferably 7 to 30 g/10 min.
[(B) Hindered Phenol-Based Antioxidizing Agent]

The polyacetal resin composition according to the present invention includes (B) the hindered phenol-based antioxidizing agent. Hereafter, (B) the hindered phenol-based antioxidizing agent may also be referred to as the "(B) component".

Examples of (B) the hindered phenol-based antioxidizing agent include 2,2'-methylenebis(4-methyl-6-t-butylphenol), hexamethylene glycol-bis(3,5-di-t-butyl-4-hydroxyhydrocinnamate), tetrakis[methylene(3,5-di-t-butyl-4-hydroxyhydrocinnamate)]methane, triethylene glycol-bis-3-(3-t-butyl-4-hydroxy-5-methylphenyl)propionate, 1,3,5-trimethyl-2,4,6-tris(3,5-di-t-butyl-4-hydroxy-benzyl)benzene, n-octadecyl-3-(4'-hydroxy-3',5'-di-t-butylphenol)propionate, 4,4'-methylenebis(2,6-di-t-butylphenol), 4,4'-butylidene-bis-(6-t-butyl-3-methyl-phenol), di-stearyl-3,5-di-t-butyl-4-hydroxybenzylphosphonate, 2-t-butyl-6-(3-t-butyl-5-methyl-2-hydroxybenzyl)-4-methylphenylacrylate, 3,9-bis{2-[3-(3-t-butyl-4-hydroxy-5-methylphenyl) propionyloxy]-1,1-dimethylethyl}-2,4,8,10-tetraoxaspiro[5, 5]undecane and the like.

In the present invention, at least one or two or more selected from these antioxidizing agents may be used.

The content of (B) the hindered phenol-based antioxidizing agent in the present invention is preferably 0.01 parts by mass or more and 1 part by mass or less relative to 100 parts by mass of the (A) component, more preferably 0.1 parts by mass or more and 0.5 parts by mass or less. A small blending amount of (B) the antioxidizing agent is not preferred because antioxidizing properties can not sufficiently be obtained. An excessive blending amount of (B) the antioxidizing agent is not preferred because mechanical properties, moldability, and the like of the resin composition may unfavorably be affected.
[(C) Nitrogen-Containing Compound]

The polyacetal resin composition according to the present invention includes (C) the nitrogen-containing compound. Hereafter, (C) the nitrogen-containing compound may also be referred to as the "(C) component".

Examples of the (C) component includes melamine and derivatives thereof (also including guanamine and derivatives thereof), melamine formaldehyde resin, hydrazide compounds, polyamide, polyacrylamide, and the like. Specific examples of melamine and derivatives thereof (also including guanamine and derivatives thereof) include melamine (2,4,6-triamino-sym-triazine), melem, melam, melon, N-butylmelamine, N-phenylmelamine, N,N-diphenylmelamine, N,N-diallylmelamine, N,N',N''-trimethylolmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-mercapto-sym-triazine, 2,4-dioxy-6-amino-sym-triazine (amelide), 2-oxy-4,6-diamino-sym-triazine (ameline), N,N,N',N'-tetracyanoethylbenzoguanamine, and the like.

As melamine formaldehyde resin, a water-insoluble melamine-formaldehyde polycondensation product may be used, which is manufactured from melamine and formaldehyde in a molar ratio of 1:0.8 to 1:10.0.

Hydrazide compounds include adipic acid hydrazide, sebacic acid hydrazide, and the like.

The content of the (C) component in the present invention is preferably 0.05 parts by mass or more and 1 part by mass or less relative to 100 parts by mass of the (A) component, more preferably 0.05 parts by mass or more and 0.7 parts by mass or less. A small blending amount of the (C) component is not preferred because thermal resistance may be decreased. An excessive blending amount of the (C) component is not preferred because unfavorable effects may arise, for example, a nitrogen compound unreacted with formaldehyde may be exuded to the surface of a molded article.

[(D) Modified Olefin-Based Polymer in which an Olefin-Based Polymer is Modified with Unsaturated Carboxylic Acid and the Like]

The polyacetal resin composition according to the present invention includes (D) a modified olefin-based polymer in which (d) an olefin-based polymer is modified with at least one selected from unsaturated carboxylic acid, acid anhydrides of the unsaturated fatty acid, and derivatives thereof. Even though a polyacetal resin composition includes an olefin-based polymer, the peeling resistance and slidability of a resin molded body including the polyacetal resin composition may be poor if the above olefin-based polymer is not a modified olefin-based polymer. Therefore, an unmodified olefin-based polymer is not preferred. Hereafter, the above modified olefin-based polymer may also be referred to as the "(D) component".

Examples of (d) the olefin-based polymer used herein include homopolymers of α-olefins such as ethylene, propylene, butene, hexene, octene, nonene, decene, and dodecen; and random, block, or graft copolymers consisting of two or more of these; and random, block, or graft copolymers including, in addition to these, at least one of comonomer components such as non-conjugated diene components such as 1,4-hexadiene, dicyclopentadiene, 5-ethylidene-2-norbornene, and 2,5-norbornadiene, conjugated diene components such as butadiene, isoprene, and piperylene, α,β-unsaturated acid such as acrylic acid and methacrylic acid or derivatives thereof such as esters, acrylonitrile, aromatic vinyl compounds such as styrene and α-methyl styrene, or vinyl esters such as vinyl acetate, vinyl ethers such as vinylmethyl ether, and derivatives of these vinyl-based compounds; and the like. There is no particular limitation for the degree of polymerization thereof, the presence and degree of side chains and branching, the copolymer composition ratio, and the like.

Examples of (d) the olefin-based polymer include high-pressure process polyethylene, medium/low-pressure process polyethylene, gas-phase process ethylene-α-olefin copolymer, LLDPE, polypropylene, polybutene, ethylene-vinyl acetate copolymer, ethylene-methyl acrylate copolymer, ethylene-ethyl acrylate copolymer, ethylene-butyl acrylate copolymer, ethylene-propylene copolymer, ethylene-propylene-diene ternary copolymer, and the like. Preferred are polyethylene, ethylene-methyl acrylate copolymer, and ethylene-ethyl acrylate copolymer.

The (D) component as used in the present invention may be prepared by modifying the aforementioned olefin-based polymer with at least one selected from the group consisting of unsaturated carboxylic acids such as acrylic acid, methacrylic acid, maleic acid, citraconic acid, itaconic acid, tetrahydrophthalic acid, nadic acid, methylnadic acid, and allylsuccinic acid; unsaturated carboxylic acid anhydrides such as maleic anhydride, citraconic anhydride, itaconic anhydride, tetrahydrophthalic anhydride, nadic anhydride, methylnadic anhydride, and allylsuccinic anhydride; derivatives thereof; and the like.

The (D) component preferably has an MI of 0.01 to 100 g/10 min., more preferably has an MI of 0.1 to 50 g/10 min., and in particular preferably has an MI of 0.2 to 30 g/10 min.

Specific examples of the preferred (D) component include polyethylene, polypropylene, ethylene-propylene copolymer, ethylene-ethyl acrylate copolymer, and the like that have been modified with maleic anhydride. Among these, the (D) component including polyethylene modified with maleic anhydride is preferred in that the peeling resistance and slidability of a resin molded body including the polyacetal resin composition are increased.

Preferred modification methods include, but not particularly limited to, a method including heating to react an olefin-based polymer with at least one compound selected form the group consisting of unsaturated carboxylic acids, anhydrides thereof, and derivatives thereof in a solution state or molten state in the presence of an appropriate radical initiator such as an organic peroxide. The suitable blending amounts of both components are 0.1 parts by mass or more and 20 parts by mass or less relative to 100 parts by mass of the olefin-based polymer, preferably 0.1 parts by mass or more and 10 parts by mass or less. When the effective amounts of such compounds in the olefin-based polymer modified with such compounds are too small, the affinity between the (A) component and the (D) component is insufficient. Therefore, too small effective amounts are not preferred. When the effective amounts of such compounds are too large, physical properties such as sliding properties, which are to be improved, may be reduced. Therefore, excessive effective amounts are not preferred.

The content of the (D) component according to the present invention is 0.5 parts by mass or more and 10 parts by mass or less relative to 100 parts by mass of the (A) component, more preferably 2 parts by mass or more and 7 parts by mass or less. A small blending amount of the (D) component is not preferred because the friction abrasion amount may be increased. An excessive blending amount of the (D) component is not preferred because mechanical physical properties and peeling resistance may be decreased.

[(E) Alkylene Glycol-Based Polymer Having a Number Average Molecular Weight of 400 or More and 500,000 or Less and Having a Primary Amino Group or a Secondary Amino Group]

The polyacetal resin composition according to the present invention includes (E) the alkylene glycol-based polymer having a number average molecular weight of 400 or more and 500,000 or less and having a primary amino group or a secondary amino group. Hereafter, the above alkylene glycol-based polymer may also be referred to as the "(E) component".

The alkylene glycol-based polymer having a primary amino group or a secondary amino group as the (E) component refers to a homopolymer or copolymer of ethylene glycol, propylene glycol, tetramethylene glycol, in which a primary or secondary amino group is included at an end or a molecular chain thereof. Further, it may be a polymer somewhat modified by formation of an ester with a fatty acid, formation of an ether with an aliphatic alcohol, and the like. Examples of this include polyethylene glycol, polypropylene glycol, polytetramethylene glycol, and copolymers consisting of these constituent units and having at least one aminopropyl group, aminooctyl group; and the like.

There is no particular limitation for the type of the polymer. However, an alkylene glycol-based polymer somewhat modified by formation of an ester with a fatty acid, formation of an ether with an aliphatic alcohol, and the like is preferred in that the peeling resistance and slidability of a resin molded body including the polyacetal resin composition is increased.

The (E) component has a number average molecular weight of 400 or more and 500,000 or less, preferably 400 or more and 100,000 or less, and more preferably 1,000 or more and 6,000 or less. This is based on the following reason. Blending of the (E) component may improve the dispersibility of the (D) component into a polyacetal resin; however, when the number average molecular weight of the (E) component is less than 400, the mechanical physical properties and sliding properties of the (A) component or the (B) component as polymeric materials may be impaired; on the other hand, when the number average molecular weight is more than 500,000, the melt viscosity is increased, resulting in poor dispersibility into a polyacetal resin.

The blending amount of the (E) component is 0.01 parts by mass or more and 5 parts by mass or less relative to the (A) component, more preferably 0.1 parts by mass or more and 4 parts by mass or less, even more preferably 0.3 parts by mass or more and 3 parts by mass or less, and in particular preferably 1 part by mass or more and 2 parts by mass or less. Of these, a blending amount of the (E) component of 1 part by mass or more is preferred in that the slidability of a resin molded body including the polyacetal resin composition can significantly be improved. A too small amount of the (E) component is not preferred because effects for improving the slidability of a resin molded body can not be obtained sufficiently. An excessive amount of the (E) component is also not preferred because mechanical physical properties may be decreased.

[(F) Surface-Untreated and Substantially Cube-Shaped Calcium Carbonate Having a BET Specific Surface Area of 20 m2/g or Less and a Mean Particle Size of 50 nm or More and 200 nm or Less]

The polyacetal resin composition according to the present invention include (F) surface-untreated and substantially cube-shaped calcium carbonate having a BET specific surface area of 15 m2/g or less and a mean particle size of 50 nm or more and 200 nm or less. Hereafter, the above calcium carbonate may also be referred to as the "(F) component".

Conventionally, use of an inorganic filler as a component of a polyacetal resin composition is known for means for improving the slidability of a resin molded article. Further, calcium carbonate, potassium titanate, barium carbonate, talc, wollastonite, mica, zinc oxide, and the like are known to serve as an inorganic filler. However, calcium carbonate is an essential element for the present invention. Inclusion of an alternative inorganic filler other than calcium carbonate as an inorganic filler is not preferred because the surface properties and peeling resistance of a resin molded body including the polyacetal resin composition will not be as excellent as those of the present invention.

The BET specific surface area of the (F) component is 15 m2/g or less. The BET specific surface area as used herein refers to a specific surface area (surface area per unit mass) determined from the amount of adsorption upon complete formation of a monomolecular layer obtained by the BET equation using nitrogen as a standard gas. The method of measuring the BET specific surface area is as defined in ASTM D-3037. A BET specific surface area of more than 15 m2/g is not preferred because the surface properties and slidability of a resin molded body including the polyacetal resin composition will be poor.

The (F) component has a mean particle size of 50 nm or more and 200 nm or less, more preferably 80 nm or more and 170 nm or less. The them "particle size" as used herein refers to a value of the arithmetic mean of the major and minor axes of a target particle as determined from 30,000× magnifying observation under a scanning electron microscope S3000H from Hitachi High-Technologies Corp. Further, the term "mean particle size" as used herein refers to a value of the arithmetic mean of the particle sizes from 100 samples. A mean particle size of less than 50 nm is not preferred because secondary aggregation may occur within a product. On the other hand, a mean particle size of more than 200 nm is not preferred in that the surface properties and slidability of a resin molded body including the polyacetal resin composition will be poor.

The (F) component is surface-untreated. The (F) component having a treated surface is not preferred because the peeling resistance and abrasion properties of a resin molded body including the polyacetal resin composition will be poor.

The term "surface untreated" as used herein means that the surfaces of calcium carbonate particles are not treated with a surface treatment agent such as an epoxy compound, an isocyanate-based compound, a titanate-based compound, and a silane-based compound.

The (F) component is substantially cube-shaped. When the (F) component is not substantially cube-shaped, for example, when it is of an irregular shape, the surface properties and slidability of a resin molded body including the polyacetal resin composition will be poor. Therefore, a not-substantially-cube-shaped form is not preferred. Note that in the present specification, whether the (F) component is substantially cube-shaped or not will be determined by burning a product, for example, at 500° C. for 3 hours, and observing the residues under an electron microscope.

The blending amount of the (F) component is 0.1 parts by mass or more and 20 parts by mass or less relative to the (A) component, more preferably 0.1 parts by mass or more and 1 part by mass or less. A too small amount of the (F) component is not preferred because the friction abrasion amount may be increased. An excessive amount of the (F) component is also not preferred because the surface properties may be deteriorated.

[(G) Partial Ester of Polyhydric Alcohol Having Valence of 2 or More and 4 or Less]

The polyacetal resin composition according to the present invention includes (G) a partial ester of a polyhydric alcohol having a valence of 2 or more and 4 or less. Hereafter, the above partial ester may also be referred to as the "(G) component".

Conventionally, use of a lubricant as a component of a polyacetal resin composition is known. Further, the followings are known as a lubricant: mineral oils, hydrocarbons, fatty acids, aliphatic alcohols, aliphatic esters consisting of fatty acids and aliphatic alcohols, partial and/or full esters of polyhydric alcohols, esters of carboxylic acids and inorganic acids, amides of fatty acids and amine compounds, metal soap, natural wax, silicone and derivatives thereof, substituted diphenyl ethers, and the like. However, a partial ester as the (G) component and an alpha olefin oligomer as the (H) component described below are both essential elements for the present invention. Inclusion of an alternative lubricant other than the above (G) and (H) components as a lubricant is not preferred because the surface properties and peeling resistance will not be as excellent as those of the present invention.

Specific Examples of the (G) component include glycerin monostearate, glycerin distearate, glycerin monobehenate, pentaerythritol monostearate, and the like. When the (G) component is not a partial ester, the surface properties and slidability of a resin molded body including the polyacetal resin composition will be poor. Therefore, a non-partial ester is not preferred.

The blending amount of the (G) component is 0.1 parts by mass or more and 10 parts by mass or less relative to the (A) component, more preferably 0.5 parts by mass or more and 2 part by mass or less. A too small amount of the (G) component is not preferred because friction abrasion amount may be increased. An excessive amount of the (G) component is also not preferred because exudation may occur.

[(H) Alpha Olefin Oligomer]

The polyacetal resin composition according to the present invention includes (H) the alpha olefin oligomer. Hereafter, the above oligomer may also be referred to as the "(H) component".

The blending amount of the (H) component is 0.1 parts by mass or more and 10 parts by mass or less relative to the (A) component, more preferably 1 part by mass or more and 5 parts by mass or less. A too small amount of the (H) component is not preferred because the slidability of a resin molded body including the polyacetal resin composition may be poor. An excessive amount of the (H) component is also not preferred because exudation and peeling may occur.

[Other Stabilizers and Additives]

Various known stabilizers may further be added to the polyacetal resin composition according to the present invention to reinforce the stability. Further, various known additives may further be blended to improve the physical properties thereof depending on the intended uses.

Examples of the additives include various colorants, parting agents, nucleating agents, antistatic agents, other surfactants, heterogenous polymers (other than the graft copolymers described above), and the like. Further, fibrous, granular, or tabular fillers of inorganic, organic, metal, or other materials may be used alone or in combination of two as long as the target performance of the composition according to the present invention is not significantly reduced.

[Preparation of Polyacetal Resin Composition]

The polyacetal resin composition according to the present invention can easily be prepared by a known method commonly used for preparing a conventional resin composition. For example, the followings may be used: (1) a method of obtaining a pellet-like composition, including mixing all the components of the composition, and feeding these to an extruder to perform melt kneading; (2) a method of obtaining a pellet-like composition, including feeding some of the components of the composition to an extruder through a main feeding inlet, and feeding the rest through a side feeding inlet to perform melt kneading; (3) a method including first preparing pellets with different compositions by extrusion and the like, and then mixing these pellets to obtain a predetermined composition.

<Sliding Member>

The sliding member according to the present invention includes a resin molded body including the aforementioned polyacetal resin composition. The sliding member has excellent friction/abrasion properties and excellent slidability against metal as well as resin. Further, it also has an excellent surface property with regard to aesthetic appearance of a surface of a resin molded article, and has excellent peeling resistance. Therefore, the sliding member may suitably be used in various sliding parts in the fields of AV, OA, and measurement instruments.

EXAMPLES

Below, the present invention will be specifically described with reference to Examples, but the present invention shall not be limited to these.

TABLE 1

|   |   | Example | | | | |
|---|---|---|---|---|---|---|
|   |   | 1 | 2 | 3 | 4 | 5 |
| A | Polyacetal resin | 100 | 100 | 100 | 100 | 100 |
| B | Hindered phenol-based antioxidizing agent | 0.3 | 0.3 | 0.3 | 0.3 | 0.3 |
| C | Nitrogen-containing compound | 0.07 | 0.07 | 0.07 | 0.07 | 0.07 |
| D | Modified olefin-based polymer |   |   |   |   |   |
| D-1 | Maleic anhydride-modified LDPE | 5 |   | 5 | 5 | 4 |
| D-2 | Maleic anhydride-modified EEA |   | 5 |   |   | 1 |
| E | Alkylene glycol-based polymer |   |   |   |   |   |
| E-1 | PEG with both ends modified with amine (Molecular weight 4000) | 0.3 | 0.3 | 1 | 0.3 | 0.3 |
| F | Specific calcium carbonate |   |   |   |   |   |
| F-1 | Specific calcium carbonate | 0.5 | 0.5 | 0.5 | 0.5 | 0.5 |
| F'-1 | Alternative calcium carbonate 1 |   |   |   |   |   |
| F'-2 | Alternative calcium carbonate 2 |   |   |   |   |   |
| F'-3 | Alternative calcium carbonate 3 |   |   |   |   |   |
| G | Partial ester of polyhydric alcohol |   |   |   |   |   |

TABLE 1-continued

|   |   | Example | | | | |
|---|---|---|---|---|---|---|
|   |   | 1 | 2 | 3 | 4 | 5 |
| G-1 | Glycerin monostearate | 1 | 1 | 1 | 1 | 1 |
| G'-1 | Stearyl stearate | | | | | |
| G'-2 | Glycerin tristearate | | | | | |
| H | Alpha olefin oligomer | 1 | 1 | 1 | 2 | 1 |

(Units are parts by mass.)

TABLE 2

|   |   | Comparative Example | | | | |
|---|---|---|---|---|---|---|
|   |   | 1 | 2 | 3 | 4 | 5 |
| A | Polyacetal resin | 100 | 100 | 100 | 100 | 100 |
| B | Hindered phenol-based antioxidizing agent | 0.3 | 0.3 | 0.3 | 0.3 | 0.3 |
| C | Nitrogen-containing compound | 0.07 | 0.07 | 0.07 | 0.07 | 0.07 |
| D | Modified olefin-based polymer | | | | | |
| D-1 | Maleic anhydride-modified LDPE | 5 | 5 | 5 | 5 | 5 |
| D-2 | Maleic anhydride-modified EEA | | | | | |
| E | Alkylene glycol-based polymer | | | | | |
| E-1 | PEG with both ends modified with amine (Molecular weight 4000) | 0.3 | 0.3 | 0.3 | 0.3 | 0.3 |
| F | Specific calcium carbonate | | | | | |
| F-1 | Specific calcium carbonate | | | | 0.5 | 0.5 |
| F'-1 | Alternative calcium carbonate 1 | 0.5 | | | | |
| F'-2 | Alternative calcium carbonate 2 | | 0.5 | | | |
| F'-3 | Alternative calcium carbonate 3 | | | 0.5 | | |
| G | Partial ester of polyhydric alcohol | | | | | |
| G-1 | Glycerin monostearate | 1 | 1 | 1 | | |
| G'-1 | Stearyl stearate | | | | 1 | |
| G'-2 | Glycerin tristearate | | | | | 1 |
| H | Alpha olefin oligomer | 1 | 1 | 1 | 1 | 1 |

(Units are parts by mass.)

Materials shown in Table 1 are as follows.
(A) Polyacetal Resin

A polyacetal copolymer obtained by copolymerizing 96.7% by weight of trioxane and 3.3% by weight of 1,3-dioxolane (Melt index (as measured at 190° C. under a load of 2160 g): 27 g/10 min.)
(B) Hindered Phenol-Based Antioxidizing Agent
    tetrakis[methylene-3-(3,5-di-t-butyl-4-hydroxyphenyl) propionate]methane (Product name: Irganox 1010, BASF Japan)
(C) Nitrogen-Containing Compound
    Melamine (Mitsui Chemicals, Inc.)
(D) Modified Olefin-Based Polymer
    (D-1) Maleic anhydride-modified low-density polyethylene (LDPE) (Product name: TAFMER MM6850, Mitsui Chemicals, Inc.)
    (D-2) Maleic anhydride-modified ethylene-ethyl acrylate copolymer (EEA) (Product name: HPR AR2011, Du Pont-Mitsui Polychemicals Co., Ltd.)
(E) Alkylene Glycol-Based Polymer Having a Number Average Molecular Weight of 400 or More and 500,000 or Less and Having a Primary Amino Group or a Secondary Amino Group
    (E-1) Polyethylene glycol (PEG) having the both ends modified with amine (Product name: CHEMISTAT Y-400, Number average molecular weight: 4,000, Sanyo Chemical Industries, Ltd.)
(F) Surface-Untreated and Substantially Cube-Shaped Calcium Carbonate Having a BET Specific Surface Area of 15 m2/g or Less and a Mean Particle Size of 50 nm or More and 200 nm or Less
    (F-1) Surface-untreated and substantially cube-shaped calcium carbonate having a BET specific surface area of 11.5 m2/g and a mean particle size of 150 nm (Product name: Brilliant 1500, colloidal calcium carbonate, Shiraishi Kogyo Kaisha Ltd.)
(F') Other Calcium Carbonates
    (F'-1) Surface-untreated and irregularly-shaped calcium carbonate having a BET specific surface area of 2.5 m2/g and a mean particle size of 1800 nm (Product name: WHITON P-30, colloidal calcium carbonate, Shiraishi Kogyo Kaisha Ltd.) (F'-2) Substantially cube-shaped calcium carbonate which has been surface-treated with an organic acid, and has a BET specific surface area of 11.5 m2/g and a mean particle size of 150 nm (Product name: Vigot 15 (surface-treated product), colloidal calcium carbonate, Shiraishi Kogyo Kaisha Ltd.)
    (F'-3) Surface-untreated and substantially cube-shaped calcium carbonate having a BET specific surface area of 18 m2/g and a mean particle size of 80 nm (Product name: HAKUENKA CC-R, Shiraishi Kogyo Kaisha Ltd.)
(G) Partial Ester of Polyhydric Alcohol
    (G-1) Glycerin monostearate (Product name: RIKEMAL 5100, Riken Vitamin Co., Ltd.)

(G') Other Esters
(G'-1) Stearyl stearate (Product name: UNISTAR M9676, NOF Corporation)
(G'-2) Glycerin tristearate (Product name: POEM S95, Riken Vitamin Co., Ltd.)
(H) Alpha Olefin Oligomer
Alpha olefin oligomer (Product name: LUCANT HC600, Mitsui Chemicals, Inc.)

Materials shown in Tables 1 and 2 were pre-blended at ratios as shown in Tables 1 and 2 (units were parts by mass), and then fed to the main feeding inlet of a 30 mm-diameter twin screw extruder having one inlet to perform melt mixing (extrusion conditions: L/D=35, extrusion temperature=200° C., screw rotation speed=120 rpm, degree of vent vacuum=−700 mmHg, discharge amount=15 kg/hr), thereby preparing a pellet-like composition.

<Evaluation>
[Evaluation of Surface Properties]
The above pellet-like composition was molded into a pin gate molded article with dimensions of 50×50×1 mmt and φ 1 mm at a cylinder temperature of 200° C., a mold temperature of 40° C., and an injection speed of 4.0 m/min. Subsequently, a surface of the pin gate molded article was visually inspected. A case where an appearance defect was not observed was evaluated as "Good=○" while a case where an appearance defect such as jetting and crater was observed was evaluated as "Poor=X". Results are shown in Table 3.

[Evaluation of Peeling Resistance
The above pin gate molded article was bent immediately after the above pin gate molded article was molded, and peeling conditions were observed. A case where neither peeling nor whitening was observed was evaluated as "Good=○", and a case where no peeling was observed, but partial whitening was observed was evaluated as "Fair=Δ", and a case where peeling or extensive whitening was observed was evaluated as "Poor=X". Results are shown in Table 3.

[Evaluation of Surface Properties]
The above pellet-like composition was molded into a pin gate molded article with dimensions of 50×50×1 mmt and φ 1 mm at a cylinder temperature of 200° C., a mold temperature of 40° C., and an injection speed of 4.0 m/min. Subsequently, a surface of the pin gate molded article was visually inspected. A case where an appearance defect was not observed was evaluated as "Good=○" while a case where an appearance defect such as jetting and crater was observed was evaluated as "Poor=X". Results are shown in Table 3.

[Evaluation of Friction Coefficient and Specific Abrasion Amount]
The above pellet-like composition was subjected to injection molding at a mold temperature of 80° C. and a cylinder temperature of 200° C. to obtain a test piece. This test piece was tested in accordance with the Suzuki friction abrasion test under conditions of load: 0.06 MPa, velocity: 15 cm/s, counterpart member: a polyacetal-resin molded article, and running time: 24 hours to evaluate dynamic friction coefficient and specific abrasion amount. Results are shown in Table 3. Note that the counterpart member is the polyacetal-resin molded body used in Examples and Comparative Examples which was obtained by injection-molding a resin composition including (A) 100 parts by mass of a polyacetal resin (B) 0.25 parts by mass of a hindered phenol-based antioxidizing agent and (C) 0.07 parts by mass of a nitrogen-containing compound at a mold temperature of 80° C. and a cylinder temperature of 200° C.

[Evaluation of Slidability Against Resin]
A case where the friction coefficient of a test piece was less than 0.3, and the specific abrasion amount of the test piece was $1.0×10^{-2}$ mm$^3$/(N~km) or less was evaluated as "Good=○", and otherwise evaluated as "Poor=X". Results are shown in Table 3.

TABLE 3

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Surface properties | ○ | ○ | ○ | ○ | ○ | X | ○ | X | X | X |
| Peeling resistance | ○ | ○ | ○ | ○ | ○ | ○ | Δ | ○ | X | X |
| Slidability against resin | ○ | ○ | ○ | ○ | ○ | X | X | X | ○ | ○ |
| Friction coefficient | 0.29 | 0.29 | 0.27 | 0.23 | 0.27 | 0.3 | 0.28 | 0.3 | 0.25 | 0.28 |
| Specific abrasion amount (×10$^{-3}$ mm$^3$/(N · km)) | 6.6 | 7.2 | 4.8 | 3.6 | 4.7 | 11 | 8 | 13 | 4.6 | 4.9 |

The polyacetal resin compositions including the (A) to (H) components were shown to be suitable for preparing a resin molded article having excellent sliding properties and abrasion resistance as well as excellent surface properties and peeling resistance (Examples). In particular, comparison of Example 1 with Example 2 reveals that inclusion of the (D) component including maleic anhydride-modified polyethylene (Example 1) is preferred in that the peeling resistance and slidability of a resin molded body including the polyacetal resin composition are increased. Further, comparison of Example 1 with Example 3 reveals that a blending amount of the (E) component of 1 part by mass or more (Example 3) is preferred in that the slidability of a resin molded body including the polyacetal resin composition can significantly be improved as compared with a case where the blending amount of the (E) component is 0.3 parts by mass (Example 1). Further, comparison of Example 1 with Example 4 reveals that a blending amount of the (H) component of 2 parts by mass or more (Example 4) is preferred in that the slidability of a resin molded body including the polyacetal resin composition can significantly be improved as compared with a case where the blending amount of the (H) component is 1 part by mass (Example 1).

Meanwhile, the followings were observed with regard to calcium carbonate as the (F) component: when the mean particle size was outside of the range of 50 nm or more and 200 nm or less, the surface properties and slidability against resin were poor (Comparative Example 1); and when calcium carbonate was surface-treated, the peeling resistance and slidability against resin were poor (Comparative Example 2); and when the BET specific surface area was not 15 m²/g or less, the surface properties and slidability against resin were poor (Comparative Example 3). Further, as observed with regard to the partial ester as the (G) component, the surface properties and peeling resistance were poor when the ester was not a partial ester (Comparative Examples 4 and 5).

The invention claimed is:

1. A polyacetal resin composition, consisting of:
   (A) 100 parts by mass of a polyacetal resin;
   (B) from 0.01 parts by mass to 1 part by mass of a hindered phenol-based antioxidizing agent;
   (C) from 0.05 parts by mass to 1 part by mass of a nitrogen-containing compound;
   (D) from 0.5 parts by mass to 10 parts by mass of a modified olefin-based polymer in which an olefin-based polymer is modified with at least one selected from the group consisting of an unsaturated carboxylic acid, an acid anhydride of an unsaturated fatty acid, and derivatives thereof;
   (E) an alkylene glycol-based polymer having a number average molecular weight of 400 or more and 500,000 or less and having a primary amino group or a secondary amino group;
   (F) from 0.1 parts by mass to 1 part by mass of surface-untreated and substantially cube-shaped calcium carbonate having a BET specific surface area of 15 m2/g or less and a mean particle size of 50 nm or more and 200 nm or less;
   (G) from 0.1 parts by mass to 10 parts by mass of a partial ester of a polyhydric alcohol having a valence of 2 or more and 4 or less; and
   (H) from 0.1 parts by mass to 10 parts by mass of an alpha olefin oligomer.

2. A sliding member, comprising a resin molded body including the polyacetal resin composition according to claim 1.

* * * * *

UNITED STATES PATENT AND TRADEMARK OFFICE
CERTIFICATE OF CORRECTION

PATENT NO. : 10,683,413 B2
APPLICATION NO. : 15/510381
DATED : June 16, 2020
INVENTOR(S) : Akihide Shimoda It is certified that error appears in the above-identified patent and that said Letters Patent is hereby corrected as shown below:

On the Title Page

In Column 2, Item (57), Line 15, under Abstract, delete "m2/g" and insert --$m^2$/g--.

In the Specification

In Column 3, Line 16 (Approx.), delete "m2/g" and insert --$m^2$/g--.

In Column 5, Line 14 (Approx.), delete "amelide" and insert --ammelide--.

In Column 5, Line 14 (Approx.), delete "ameLine" and insert --ammeLine--.

In Column 5, Line 57, delete "norbonadiene" and insert --norbornadiene--.

In Column 7, Line 54, delete "m2/g" and insert --$m^2$/g--.

In Column 7, Line 59, delete "m2/g" and insert --$m^2$/g--.

In Column 8, Line 8, delete "m2/g" and insert --$m^2$/g--.

In Column 8, Line 15, delete "m2/g" and insert --$m^2$/g--.

In Column 8, Line 20, delete "The them" and insert --The term--.

In Column 12, Line 42 (Approx.), delete "m2/g" and insert --$m^2$/g--.

In Column 12, Line 46, delete "m2/g" and insert --$m^2$/g--.

In Column 12, Line 51, delete "m2/g" and insert --$m^2$/g--.

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,683,413 B2

In Column 12, Line 56 (Approx.), delete "m2/g" and insert --$m^2/g$--.

In Column 12, Line 63 (Approx.), delete "m2/g" and insert --$m^2/g$--.

In Column 12, Line 67 (Approx.), delete "5100" and insert --S100--.

In Column 13, Line 46, delete "Resistance" and insert --Resistance]--.

In Column 14, Line 21, delete "N~km" and insert --N km--.

In the Claims

In Column 16, Line 10, Claim 1, delete "m2/g" and insert --$m^2/g$--.